US010071917B2

(12) United States Patent
Lim et al.

(10) Patent No.: US 10,071,917 B2
(45) Date of Patent: Sep. 11, 2018

(54) SOFTENING APPARATUS

(71) Applicants: SAMSUNG ELECTRONICS CO., LTD., Suwon-si (KR); INHA-INDUSTRY PARTNERSHIP INSTITUTE, Incheon (KR)

(72) Inventors: Chang Bae Lim, Suwon-si (KR); Wha-Seung Ahn, Incheon (KR); Da Eun Kim, Seoul (KR); Hee-Jin Park, Suwon-si (KR); Moon Il Jung, Suwon-si (KR); In Jo Jeong, Yongin-si (KR)

(73) Assignees: SAMSUNG ELECTRONICS CO., LTD., Suwon-si (KR); INHA-INDUSTRY PARTNERSHIP INSTITUTE, Incheon (KR)

( * ) Notice: Subject to any disclaimer, the term of this patent is extended or adjusted under 35 U.S.C. 154(b) by 397 days.

(21) Appl. No.: 14/666,736

(22) Filed: Mar. 24, 2015

(65) Prior Publication Data

US 2015/0274545 A1    Oct. 1, 2015

(30) Foreign Application Priority Data

Mar. 28, 2014    (KR) .......................... 10-2014-0036448

(51) Int. Cl.
*B01D 15/00*    (2006.01)
*C02F 9/00*    (2006.01)
(Continued)

(52) U.S. Cl.
CPC ............... *C02F 1/008* (2013.01); *B01J 49/30* (2017.01); *C02F 1/42* (2013.01); *C02F 1/4618* (2013.01);
(Continued)

(58) Field of Classification Search
CPC ...... C02F 1/42; C02F 1/46; C02F 2201/4612; C02F 2209/006; C02F 2209/06;
(Continued)

(56) References Cited

U.S. PATENT DOCUMENTS 2,793,183 A    5/1957    Thurman et al.
5,788,826 A *  8/1998    Nyberg .................... B01J 47/08
                                                         204/536
(Continued)

FOREIGN PATENT DOCUMENTS

DE    43 12 600 A1    10/1994
EP        0621238    * 10/1994    .............. B01J 49/00
(Continued)

OTHER PUBLICATIONS

Extended European Search Report dated Aug. 12, 2015 in corresponding European Patent Application No. 15160863.5.
(Continued)

*Primary Examiner* — Ana Fortuna
(74) *Attorney, Agent, or Firm* — Staas & Halsey LLP

(57) ABSTRACT

A softening apparatus including an ion exchanger that is repeatedly regenerated using electrolyzed hydrogen ions ($H^+$). The softening apparatus includes a regeneration unit configured to produce regeneration water including hydrogen ions ($H^+$) by electrolyzing water, a softening unit including an ion exchanger regenerated by receiving the regeneration water and configured to convert raw water including hardness components into soft water, and a controller configured to control the regeneration unit to produce regeneration water having a pH of 2 to 4. The ion exchanger has a Si/Al ratio of 1 to 5 and includes an inner pore with a diameter greater than 4 nm.

23 Claims, 17 Drawing Sheets

(51) Int. Cl.
- *B01D 21/30* (2006.01)
- *C02F 1/00* (2006.01)
- *C02F 1/42* (2006.01)
- *C02F 1/461* (2006.01)
- *B01J 49/30* (2017.01)

(52) U.S. Cl.
CPC ............... *C02F 2001/46185* (2013.01); *C02F 2209/005* (2013.01); *C02F 2209/05* (2013.01); *C02F 2209/055* (2013.01); *C02F 2209/06* (2013.01); *C02F 2209/40* (2013.01); *C02F 2303/16* (2013.01)

(58) Field of Classification Search
CPC ...... C02F 1/461; C02F 2323/06; C02F 1/283; C02F 1/46; B01D 2311/2623
See application file for complete search history.

(56) References Cited

U.S. PATENT DOCUMENTS

| | | | | |
|---|---|---|---|---|
| 5,814,224 | A * | 9/1998 | Khamizov | B01J 39/02 210/638 |
| 2004/0149663 | A1 * | 8/2004 | Nakanishi | C02F 1/4674 210/98 |
| 2007/0084771 | A1 * | 4/2007 | Watanabe | B01D 61/08 210/175 |
| 2008/0164213 | A1 * | 7/2008 | Grott | B01J 39/02 210/670 |
| 2008/0245739 | A1 * | 10/2008 | Honji | B01J 20/3441 210/670 |
| 2013/0183230 | A1 * | 7/2013 | Li | C01B 39/026 423/701 |
| 2013/0248375 | A1 * | 9/2013 | Sanchez | C25B 15/08 205/335 |
| 2013/0292335 | A1 * | 11/2013 | Lahav | A01K 63/04 210/664 |
| 2015/0182953 | A1 * | 7/2015 | Senderov | B01J 29/83 423/714 |
| 2015/0274545 | A1 * | 10/2015 | Lim | C02F 1/008 210/662 |

FOREIGN PATENT DOCUMENTS

| | | |
|---|---|---|
| JP | 2009-165954 | 7/2009 |
| KR | 10-2012-0107308 | 10/2012 |
| WO | 2015/050357 | 4/2015 |

OTHER PUBLICATIONS

European Office Action dated Sep. 25, 2017 in European Patent Application No. 15160863.5.

* cited by examiner

FIG. 3
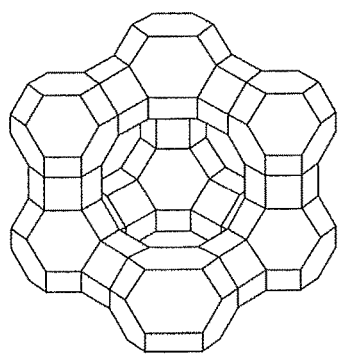
(a) ZEOLITE Y
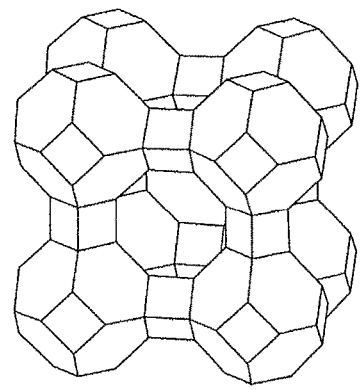
(b) ZEOLITE A

FIG. 4

| Si/Al ≤ 2 | 2 ≤ Si/Al ≤ 5 |
|---|---|
| ABW, Li-A(BW) | BHP, linde Q |
| AFG, afghanite[a] | BOG, boggsite[a] |
| ANA, analcime[a] | BRE, brewsterite[a] |
| BIK, bikitaite[a] | CAS, Cs-aluminosilicate[a] |
| CAN, cancrinite[a] | CHA, chabazite[a] |
| EDI, edingtonite[a] | CHI, chiavennite[a] |
| FAU, NaX | DAC, dachiardite[a] |
| FRA, franzinite | EAB, EAB |
| GIS, gismondine[a] | ENT, hexagonal faujasite |
| GMF, gmelinite[a] | EPI, epistilbite[a] |
| JBW, NaJ | ERI, erionite[a] |
| LAU, laumonite[a] | FAU, fauhasite[a], NaY |
| LEV, levyne[a] | FER, ferrierite[a] |
| LIO, liottire[a] | GOO, goosecreekite[a] |
| LOS, losod | HEU, heulandite[a] |
| LTA, linde Type A | KFI, ZK-5 |
| LTN, NaZ-21 | LOV, lovdarite[a] |
| NAT, natrolite[a] | LTA, ZK-4 |
| PAR, partheite[a] | LTL, linde L |
| PHI, phillipaite[a] | MAZ, mazzite[a] |
| ROG, roggianite[a] | MEI, ZSM-18 |
| SOD, sodalite[a] | MER, merlinoite[a] |
| WEN, wenkite[a] | MON, montasommaite[a] |
| THO, thomsonite[a] | MOR, mordenite[a] |
| TSC, tschortnerite[a] | OFF, offretite[a] |
|  | PAU, paulingite[a] |
|  | RHO, rho |
|  | SOD, sodalite |
|  | STI, atilbite[a] |
|  | YUG, yugawaralite[a] |

FIG. 5

| Code | Examples[a] | Pore structure[g] |
|---|---|---|
| ABW | Li-A(BW), Cs[SiAlO$_4$] | 8 3.4 X 3.8 |
| AFI | AlO$_4$-5 | 12 7.3 |
| AFS | MAPSO-46 | 12 6.3 |
| ANA | Analcime, leicite, pollucite, viseite, wairakite, Na-B AlPO$_4$-24, Cs$_2$[FeSi$_5$O$_{12}$] | 8 distorted |
| BEA | Beta,[h] NU-2[h] | 12 7.3 X 6.0 |
| CAN | Cancrinite, tiptopite ECR-5 | 12 5.9 |
| CHA | Chabazite, linde D, linde R, ZK-14, SAPO-34, MeAPO-47 | 8 3.8 X 3.8 |
| EDI | Edingtonite, K-F, linde F | 8 2.8 |
| EMT | ZSM-20[i] | 12 7.6 |
| ERI | Erionite, linde T[j], AlO$_4$-17 | 8 3.6 |
| FAU | Faujasite, linde X, linde Y, LZ-210, SAPO-37 | 12 7.4 |
| FER | Ferrierite, Sr-D, FU-9, ZSM-35, ISI-6 | 10 4.2 X 5.4* ↔ 8 3.5 X 4.8* |
| HEU | Heulandite, clinoptilolite, LZ-219 | 8 2.6 X 4.7 |
| KFI | ZK-5, Ba-P, Ba-Q | 8 3.9 |
| LTA | Linde A, ZK-4, N-A, alpha ZK-21, ZK-22, SAPO-42 | 8 4.1 |
| LTL | Linde L, K(Ba)G(L), ECR-3, perlialite | 12 7.1* |
| MAZ | Mazzite, omega, ZSM-4 | 12 7.4 |
| MEL | ZSM-11 | 12 5.3 X 5.4 |
| MFI | ZSM-5, silicate AMS-IB, NU-4 | 10 5.3 X 5.6 |
| MOR | Mordenite, ptilolite, Zeolon, Na-D | 12 6.7 X 7.0 |

FIG. 6

CHEMICAL COMPOSITION (XRF)                                    (atomic %)

| | Si/Al | Si | Al | Na | O | etc. |
|---|---|---|---|---|---|---|
| Y (Aldrich) | 3.6 | 33.85 | 9.29 | 7.32 | 49.43 | 0.11 |
| CBV 720(USY) | 21 | 44.87 | 2.06 | 0.04 | 53.00 | 0.03 |
| CBV 780 | 58 | 46.00 | 0.80 | 0 | 53.16 | 0.02 |
| ZSM-5 | 211 | 46.54 | 0.22 | 0 | 53.23 | 0.02 |
| NaY (Powder) | 3.37 | 33.00 | 9.77 | 8.01 | 49.12 | 0.10 |
| NaY (Bead 0.5) | 3.41 | 33.47 | 9.8 | 7.01 | 49.42 | 0.3 |
| NaY (Bead 1.7) | 4.2 | 33.87 | 8.06 | 4.7 | 49.30 | 4.07 |
| HY (Powder) | 3.9 | 37.39 | 9.51 | 0.45 | 51.74 | 0.91 |
| CaX (Bead) | 2.1 | 24.18 | 11.46 | 1.14 | 45.21 | 18.01 |

FIG. 8
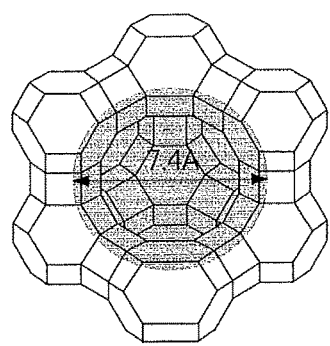
(a) ZEOLITE Y
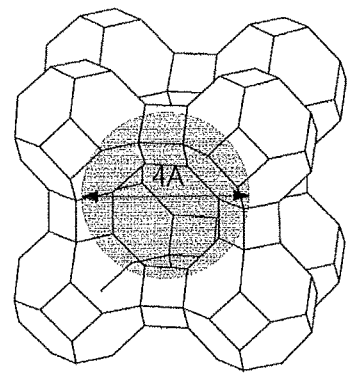
(b) ZEOLITE A

FIG. 9
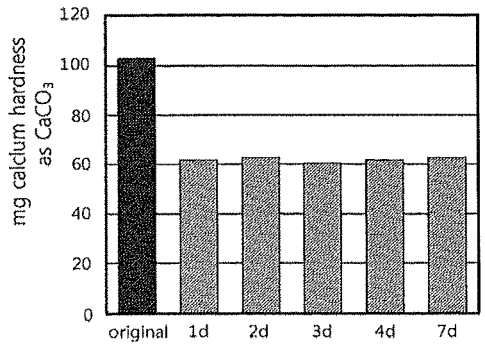
(a)
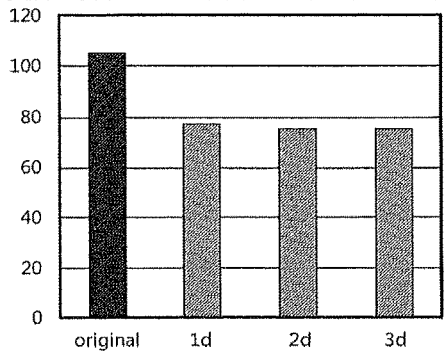
(b)
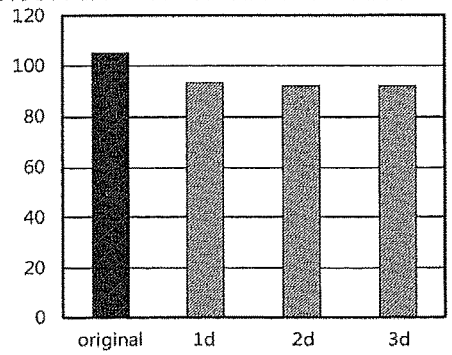
(c)

SOFTENING APPARATUS

CROSS-REFERENCE TO RELATED APPLICATIONS

This application claims the benefit of Korean Patent Application No. 10-2014-0036448, filed on Mar. 28, 2014 in the Korean Intellectual Property Office, the disclosure of which is incorporated herein by reference.

BACKGROUND

1. Field

Embodiments of the present disclosure relate to a softening apparatus including an ion exchanger that may be repeatedly regenerated using hydrogen ions ($H^+$) produced by electrolysis.

2. Description of the Related Art

When detergents are used in household appliances using water, such as washing machines and dishwashers to remove non-polar contaminants, washing performance may be reduced due to hardness of water, microorganisms proliferating in water may cause contamination, and scales may develop.

A method of increasing solubility of detergents by heating water using a heater, a method of removing hardness components via ion exchange, and capacitive deionization (CDI) that is an electrochemical method using electrostatic attraction of ion components have been utilized in order to prevent the reduction in washing performance caused by hard water. However, since hardness components ($Ca^{2+}$ and $Mg^{2+}$) cannot be completely removed according to these methods, the hardness components may be precipitated in objects to be washed, or a complicated system may be required thereby increasing manufacturing costs and requiring high energy consumption.

High-temperature sterilization, bleach sterilization, anion sterilization, and the like have been used to remove microorganism contamination. However, these methods also require high energy consumption, use of additional chemicals may cause inconvenience of customers, and practical use thereof is limited due to environmental regulations. Furthermore, there is no substantial solution for the contamination caused by scales.

Therefore, ion exchange by using a cation exchange resin has been developed. In this case, a polymer chain including a functional group such as a sulfonyl group or a carboxyl group releases a counter-ion of the functional group such as a sodium ion ($Na^+$) and adsorbs a positively charged hardness component such as a calcium ion ($Ca^{2+}$) and a magnesium ion ($Mg^{2+}$). However, since the number of the functional groups in the polymer is limited, metallic cations such as calcium ions ($Ca^{2+}$) and magnesium ions ($Mg^{2+}$) cannot be adsorbed by the polymer after the polymer is saturated. Accordingly, a regeneration process is required to remove the adsorbed cations and allow the polymer to re-adsorb the metallic cations.

As a system including a regeneration process after performing a softening process, an ion exchange resin method, capacitive deionization, and a method of using bipolar membrane may be used. However, these methods are not available due to high manufacturing costs, inconvenience of regeneration, and environmental pollution.

SUMMARY

Therefore, it is an aspect of the present disclosure to provide a softening apparatus including an ion exchanger that may be repeatedly regenerated using hydrogen ions ($H^+$) produced by electrolysis.

More particularly, a softening apparatus including an ion exchanger having a predetermined pore diameter or greater and having a Si/Al ratio of 1 to 5 is provided.

It is another aspect of the present disclosure to provide a softening apparatus configured to produce regeneration water having a pH of 2 to 4 and supply the regeneration water to an ion exchanger.

Additional aspects of the disclosure will be set forth in part in the description which follows and, in part, will be obvious from the description, or may be learned by practice of the disclosure.

In accordance with one aspect of the present disclosure, a softening apparatus includes a regeneration unit configured to produce regeneration water including hydrogen ions ($H^+$) by electrolyzing water, a softening unit including an ion exchanger regenerated by receiving the regeneration water and configured to convert raw water including hardness components into soft water, and a controller configured to determine a time-point to initiate regeneration, and control the regeneration unit to produce regeneration water having a pH of 2 to 4 when the time-point to initiate regeneration is determined.

The ion exchanger may have a Si/Al ratio of 1 to 5.

The ion exchanger may have an inner pore.

The pore may have a diameter greater than 4 nm.

The ion exchanger may have acid resistance against regeneration water produced by electrolysis.

The ion exchanger may include zeolite Y.

The ion exchanger may be used in at least one form selected from the group consisting of powder form, bead form, or fiber form.

The ion exchanger may be used in a form adhered to a fibrous or porous polymer.

The polymer may be formed of a material including polypropylene (PP).

The regeneration unit may include a housing defining an appearance and electrodes disposed in the housing.

The controller may control power applied to the electrodes to allow the regeneration unit to produce regeneration water having a pH of 2 to 4.

The controller may control the regeneration water to periodically be supplied to the ion exchanger.

The softening apparatus may further include a hardness sensor configured to sense hardness of soft water discharged from the softening unit, and the controller may determine a time-point to initiate regeneration when an output of the hardness sensor reaches a preset first reference for hardness.

The softening apparatus may further include an electrical conductivity sensor configured to sense electrical conductivity of soft water discharged from the softening unit, and the controller may determine a time-point to initiate regeneration when an output of the electrical conductivity sensor reaches a preset second reference for electrical conductivity.

The softening apparatus may further include a flow rate sensor configured to sense flow rate of soft water discharged from the softening unit, and the controller may determine a time-point to initiate regeneration when an output of the flow rate sensor reaches a preset third reference for flow rate.

The softening apparatus may further include a pH sensor configured to sense the pH of the regeneration water.

The controller may receive data sensed by the pH sensor and control the regeneration unit to produce regeneration water having a pH of 2 to 4.

In accordance with another aspect of the present disclosure, a method of controlling a softening apparatus including a regeneration unit configured to produce regeneration water including hydrogen ions ($H^+$) by electrolyzing water, and a softening unit including an ion exchanger regenerated by receiving the regeneration water and configured to convert raw water including hardness components into soft water includes determining a time-point to initiate regeneration, and controlling the regeneration unit to produce regeneration water having a pH of 2 to 4 when the time-point to initiate regeneration of the ion exchanger is determined.

The regeneration unit may include electrodes, and the producing of regeneration water having a pH of 2 to 4 when the time-point to initiate regeneration of the ion exchanger is determined may include controlling power applied to the electrodes such that the regeneration unit produces regeneration water having a pH of 2 to 4.

The softening apparatus may further include a pH sensor configured to sense the pH of the regeneration water, and the producing of regeneration water having a pH of 2 to 4 when the time-point to initiate regeneration of the ion exchanger is determined may include producing regeneration water having a pH of 2 to 4 by receiving data sensed by the pH sensor.

The softening apparatus may further include a hardness sensor configured to sense hardness of soft water discharged from the softening unit, and the determining of the time-point to initiate regeneration may include determining a time-point to initiate regeneration when an output from the hardness sensor reaches a preset first reference for hardness.

The softening apparatus may further include an electrical conductivity sensor configured to sense electrical conductivity of soft water discharged from the softening unit, and the determining of the time-point to initiate regeneration may include determining a time-point to initiate regeneration when an output from the electrical conductivity sensor reaches a preset second reference for electrical conductivity.

The softening apparatus may further include a flow rate sensor configured to sense flow rate of soft water discharged from the softening unit, and the determining of the time-point to initiate regeneration may include determining a time-point to initiate regeneration when an output from the flow rate sensor reaches a preset third reference for flow rate

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a diagram illustrating structures of zeolite Y and zeolite A as examples of zeolite;

FIG. 4 illustrates types of zeolite according to atomic ratio of silicon (Si) and aluminum (Al);

FIG. 5 illustrates pore sizes of zeolites according to the types thereof;

FIG. 6 illustrates components of zeolites according to the types thereof;

FIG. 8 is a diagram illustrating pore diameters of zeolite Y ((a) of FIG. 3) and zeolite A ((b) of FIG. 3).

FIG. 9 illustrates graphs of acid resistance of zeolite Y according to types of acid, for example, hydrogen chloride (HCl), acetic acid ($CH_3COOH$), and electrolyzed ionic-water;

DETAILED DESCRIPTION

Figure 1:
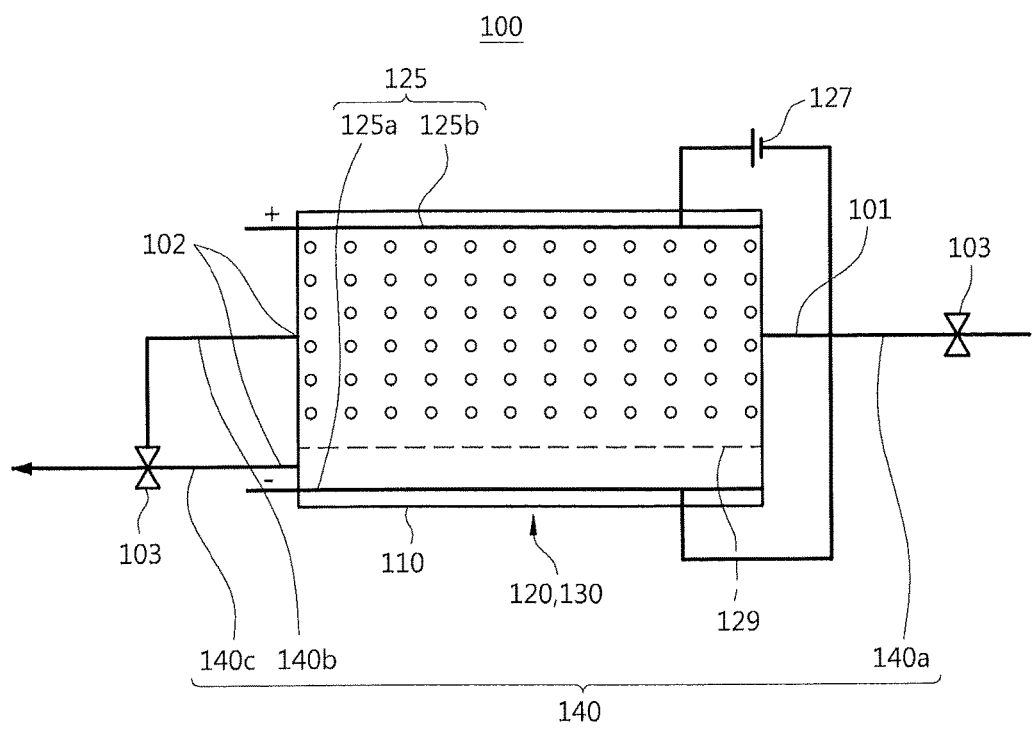
FIG. 1 is a diagram illustrating a configuration of a softening apparatus according to an embodiment of the present disclosure.

Reference will now be made in detail to the embodiments of the present disclosure, examples of which are illustrated in the accompanying drawings, wherein like reference numerals refer to like elements throughout.

According to an embodiment of the present disclosure, a softening apparatus configured to soften raw water including hardness components is provided. In this specification, supply water including hardness components and introduced into the softening apparatus is referred to as raw water, raw water discharged from a softening unit from which the hardness components are removed is referred to as soft water, supply water produced in a positive electrode during electrolysis, supplied to an ion exchanger, and having a high concentration of hydrogen ions ($H^+$) is referred to as regeneration water, water produced in a negative electrode during electrolysis, discharged to the outside, and having a high concentration of hydroxide ions ($OH^-$) is referred to as alkaline water, and regeneration waste water including a high concentration of hardness components produced during a regeneration process is referred to as concentrated water, for descriptive convenience. In addition, the hardness components should be understood to include cations having positive charges in addition to calcium ions ($Ca^{2+}$) and magnesium ions ($Mg^{2+}$), and the terms lindeX and lindeY may respectively be used interchangeably with zeolite X and zeolite Y.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals in the drawings denote like elements.

Figure 2:
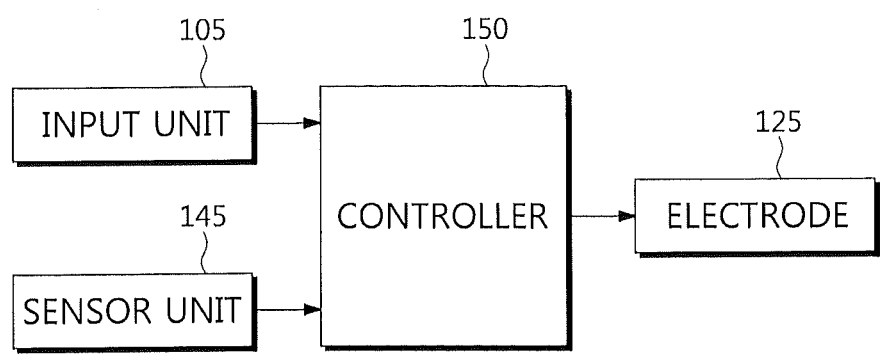
FIG. 2 is a control block diagram of the softening apparatus of FIG. 1.

FIG. 1 is a diagram illustrating a configuration of a softening apparatus 100 according to an embodiment of the present disclosure. FIG. 2 is a control block diagram of the softening apparatus 100 of FIG. 1.

Referring to FIGS. 1 and 2, the softening apparatus 100 according to the illustrated embodiment includes an input unit 105 configured to input an instruction to operate the softening apparatus 100, a housing 110 including an inlet 101 and an outlet 102, a regeneration unit (regenerator) 120 configured to produce regeneration water including hydrogen ions ($H^+$) through electrolysis of water, a softening unit (softener) 130 including an ion exchanger regenerated by receiving regeneration water and softening raw water including hardness components into soft water including hydrogen ions ($H^+$), a fluid passage 140 configured to guide soft water discharged from the softening unit 130 and alkaline water, regeneration water, and concentrated water discharged from the regeneration unit 120, a sensor unit 145 configured to acquire data for sensing a time-point to initiate regeneration, and a controller 150 configured to produce regeneration water having a pH of 2 to 4 after determining the time-point to initiate regeneration.

The softening unit 130 and the regeneration unit 120 are respectively configured to produce soft water and regenerate the ion exchanger, and components thereof may be separately provided. However, according to the illustrated embodiment, a component for producing soft water and a component for regenerating the ion exchanger are integrated with each other within the housing 110. Thus, the same physical part may be referred to as the softening unit 130 when serving to soften water and may be referred to as the regeneration unit 120 when serving to regenerate the ion exchanger.

Hereinafter, the components of the softening apparatus 100 will be described in more detail.

The input unit 105 receives an operation instruction to activate operation of the softening apparatus 100 and an operation stop instruction to inactivate the softening apparatus 100 from a user. Also, the input unit 105 may receive an automatic regeneration mode instruction to automatically perform the regeneration mode and may receive a regeneration mode activation instruction to manually activate the regeneration mode and a regeneration mode inactivation instruction to manually inactivate the regeneration mode. The input unit 105 may employ a pressure type switch or a touch pad.

The housing 110 includes the inlet 101 connected to a raw water pipe through which raw water is introduced and the outlet 102 connected to a discharge pipe through which soft water or the like is discharged. The inlet 101 may be formed in the central axis of the upper surface of the housing 110, and the outlet 102 may be formed in the central axis of the lower surface of the housing 110. Valves 103 may respectively be installed at the inlet 101 and the outlet 102 to open and close the passages of raw water introduced into the inlet 101 and soft water discharged through the outlet 102. Inflow of raw water and outflow of soft water may be adjusted by controlling each of the valves 103 in accordance of operation of the softening apparatus 100.

The regeneration unit 120 electrolyzes raw water in order to remove impurities, i.e., hardness components ($Ca^{2+}$ and $Mg^{2+}$) accumulated in an ion exchanger. More particularly, the ion exchanger is regenerated by supplying hydrogen ions ($H^+$) produced during electrolysis of water into the ion exchanger.

The regeneration unit 120 may include electrodes 125 configured to electrolyze raw water, a power supply 127 configured to apply power to the electrodes 125, and a separator 129 disposed between the electrodes 125 and allowing selective ion permeation.

The electrodes 125 may include a single or multiple positive electrodes 125a and a single or multiple negative electrodes 125b each having a planar or circular shape. In the softening unit 130 and the regeneration unit 120 illustrated in FIG. 1, a single positive electrode 125a and a single negative electrode 125b each having a planar shape are disposed. Although electrodes are generally formed of conductive materials, the electrodes 125 according to the illustrated embodiment may be formed of not only conductive materials but also materials with ion-exchange performance.

The separator 129 may be installed between the positive electrode 125a and the negative electrode 125b to separate the positive electrode 125a and the negative electrode 125b from each other. When a plurality of positive electrodes 125a and a plurality of negative electrodes 125b are used, a plurality of separators 129 may be used to respectively separate the positive electrodes 125a and the negative electrodes 125b from each other. According to the illustrated embodiment, a single positive electrode 125a and a single negative electrode 125b are used and separated from each other by using a single separator 129.

The separator 129 allows selective permeation of ions. More particularly, the separator 129 may allow selective permeation of cations, thereby preventing hydroxide ions ($OH^-$) produced in the negative electrode 125b and hydrogen ions ($H^+$) produced in the positive electrode 125a from being supplied to the ion exchanger in a mixed state. In addition, the separator 129 according to the illustrated embodiment may include at least one selected from the group consisting of non-woven fabric, membrane, and cation exchange membrane.

The softening unit 130 removes hardness components ($Ca^{2+}$ and $Mg^{2+}$) from raw water introduced through the inlet 101, thereby converting the raw water into soft water. Soft water is produced depending on ion exchanging capability of the ion exchanger. The softening unit 130 may be integrated with the regeneration unit 120 or separated therefrom. FIG. 1 exemplarily illustrates that the softening unit 130 is integrated with the regeneration unit 120.

Ion exchangers that are materials serving as ion exchange media with ion exchanging capability are classified into ion exchange resin and zeolite, which is used as an ion exchanger herein. According to the illustrated embodiment, zeolite is used as the ion exchanger.

The principle of ion exchange by zeolite is related to the structure of zeolite. In this regard, FIG. 3 illustrates structures of zeolite Y and zeolite A as examples of zeolite. FIG. 4 illustrates types of zeolite according to atomic ratio of silicon (Si) and aluminum (Al) which are main components of zeolite. FIG. 5 illustrates pore sizes of zeolite according to the types thereof. FIG. 6 illustrates components of zeolite according to the types thereof.

In general, zeolite has a three-dimensional (3D) structure having a pore therein as illustrated in zeolite Y of (a) of FIG. 3 and zeolite A of (b) of FIG. 3. Zeolite includes silicon and aluminum as main components and is classified into various types of zeolite according to framework structures thereof. Over 200 types of zeolite have been reported. According to the illustrated embodiment, several types of zeolite having a framework structure with a pore are selected and applied as ion exchangers.

Zeolite applicable to the softening apparatus 100 according to the illustrated embodiment may have a Si/Al ratio of 1 to 5 and may have a pore with a diameter greater than 4 nm. Furthermore, since zeolite is repeatedly exposed to acidic conditions during regeneration, zeolite having acid resistance may be used. More particularly, zeolite having acid resistance at a pH of 2 to 4 may be used.

In this regard, referring to FIG. 4, examples of zeolite having a Si/Al ratio of 5 or less may include zeolite structure codes ABW, AFG, ANA, BIK, CAN, EDI, FAU, FRA, GIS, GMF, JBW, LAU, LEV, LIO, LOS, LTA, LTN, NAT, PAR, PHI, ROG, SOD, WEN, THO, and TSC. In addition, referring to FIG. 5, examples of zeolite having a suitable Si/Al ratio and a pore diameter greater than 4 nm may include zeolite structure codes FAU and LTA. Examples of the FAU type zeolite may include Faujasite, linde X, linde Y, LZ-210, and SAPO-37, and examples of the LTA type zeolite may include Linde A, ZK-4, N-A, alpha, ZK-21, ZK-22, and SAPO-42. In addition, examples of zeolite satisfying the aforementioned conditions and having acid resistance at a pH of 2 to 4 may include linde X and linde Y.

FIG. 5 illustrates results of monitoring components according to types of zeolite by using an X-ray fluorescence (XRF). Referring to FIG. 5, CBV 720, CBV 780, and ZSM-5 are not suitable for softening water due to a small number of sodium counter-ions which indicate ion-exchange sites. Zeolite X (CaX) has less acid resistance than zeolite Y (Y(Aldrich), NaY, and HY) since zeolite X has a relatively low Si/Al ratio. Accordingly, zeolite Y that satisfies the aforementioned conditions may be used as the ion exchanger according to the illustrated embodiment.

Hereinafter, the principle of using zeolite Y having a Si/Al ratio of 1 to 5, a pore with a diameter greater than 4 nm, and acid resistance in a pH of 2 to 4, as the ion exchanger will be described.

First, zeolite according to the illustrated embodiment may have a Si/Al ratio of 1 to 5 and may be represented by Structural Formula 1 below.

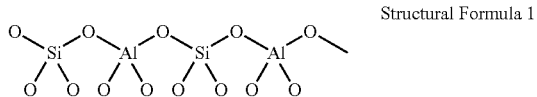

Structural Formula 1

Referring to Structural Formula 1, zeolite consists of silicon and aluminum as central atoms. Since aluminum in the molecule thereof is charged with anions, zeolite adsorbs metal cations, thereby having ion exchange capability.

Among various types of zeolite, zeolite A includes the same number of silicon and aluminum atoms. Since Al contained in zeolite A is decomposed by an acid through a reaction represented by Formula 1, zeolite A cannot be repeatedly regenerated.

$$Al_2O_3 + 6HCl \rightarrow 2AlCl_3 + 3H_2O$$

Formula 1

That is, while ion exchange sites are formed by the presence of aluminum, more particularly, by anions around aluminum, excess aluminum may cause a corrosion reaction represented by Formula 1. Thus, an appropriate amount of Al should be used. In other words, when the Si/Al ratio is greater than 5, zeolite is not suitable for the ion exchanger due to insufficient ion exchange sites. Accordingly, zeolite having a Si/Al ratio of 1 to 5 may be used as the ion exchanger according to the illustrated embodiment so as to satisfy the aforementioned two conditions.

Next, zeolite according to the illustrated embodiment may have a pore with a diameter greater than 4 nm. If the pore in the zeolite has a diameter less than 4 nm, ion exchange between a hydrated calcium ion ($Ca^{2+}$) or a magnesium ion ($Mg^{2+}$) and another cation contained in the pore such as a sodium ion ($Na^+$) or a hydrogen ion ($H^+$) may not be carried out.

Figure 7:
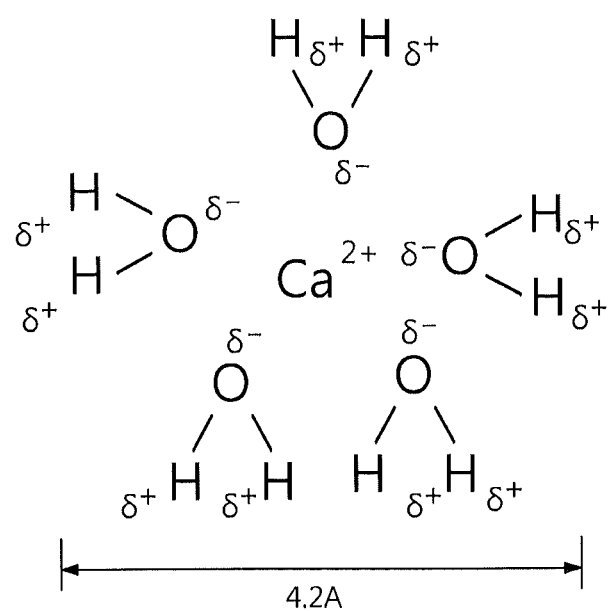
FIG. 7 is a diagram illustrating a hydrated calcium ion.

In this regard, FIG. 7 illustrates a hydrated calcium ion ($Ca^{2+}$). FIG. 8 is a diagram illustrating pore diameters of zeolite Y ((a) of FIG. 3) and zeolite A ((b) of FIG. 3).

As illustrated in FIG. 7, when a calcium ion ($Ca^{2+}$) is hydrated, a hydrodynamic diameter of the calcium ion ($Ca^{2+}$) is about 4.2 Å. The pore diameter of zeolite needs to be greater than the hydrodynamic diameter of the calcium ion ($Ca^{2+}$) for an efficient ion exchange through zeolite. Thus, zeolite having a pore diameter greater than 4 nm may be used as the ion exchanger according to the illustrated embodiment.

For example, since zeolite Y illustrated in (a) of FIG. 8 has a pore diameter of 7.4 Å, a calcium ion ($Ca^{2+}$) having a hydrodynamic diameter of 4.2 Å may be efficiently exchanged with a cation contained in the pore of the zeolite Y. However, since zeolite A illustrated in (b) of FIG. 8 has a pore diameter of 4 Å, a calcium ion ($Ca^{2+}$) having a hydrodynamic diameter of 4.2 Å cannot be efficiently exchanged with a cation contained in the pore of the zeolite A. Thus, zeolite Y may be used as the ion exchanger more efficiently.

In addition, zeolite according to the illustrated embodiment may have acid resistance against electrolyzed water having a pH of 2 to 4. In this regard, acid resistance of zeolite may vary according to types and pH of acid.

Figure 10:
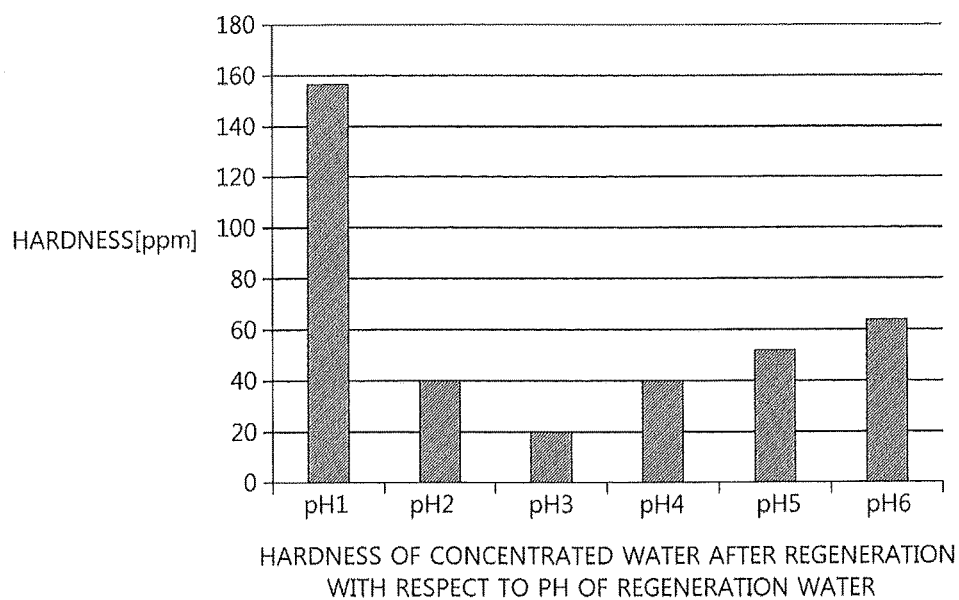
FIG. 10 is a graph illustrating hardness of concentrated water after regeneration with respect to pH of regeneration water.

FIG. 9 illustrates graphs of acid resistance of zeolite Y according to types of acid, for example, hydrogen chloride (HCl), acetic acid ($CH_3COOH$), and electrolyzed ionic-water. FIG. 10 is a graph illustrating hardness of concentrated water after regeneration with respect to pH of regeneration water.

Referring to FIG. 9, ion exchange capacity was reduced by 38 to 41% when hydrogen chloride is used as regeneration water as illustrated in (a) of FIG. 9. Ion exchange capacity was reduced by 28 to 30% when acetic acid is used as regeneration water as illustrated in (b) of FIG. 9. Ion exchange capacity was reduced by 15 to 18% when electrolyzed ionic-water is used as regeneration water as illustrated in (c) of FIG. 9. Through the results thereof, it was confirmed that the softening apparatus 100 according to the illustrated embodiment may use electrolyzed ionic-water as regeneration water in order to repeatedly regenerate and use zeolite Y.

FIG. 10 illustrates hardness of soft water produced by re-introducing raw water into regenerated zeolite Y with respect to the pH of regeneration water. Soft water produced by re-introducing raw water into zeolite Y regenerated with regeneration water having a pH of 3 has the lowest hardness of about 20 ppm. Soft water produced by re-introducing raw water into zeolite Y regenerated with regeneration water having a pH of 2 to 4 has a hardness of about 40 ppm, slightly increased compared to the hardness at the pH of 3. The hardness increases in soft water produced by re-introducing raw water into the regenerated zeolite Y as the pH increases toward 5 and 6 and as the pH decreases toward 1. The fact that the soft water produced by re-introducing raw water into the regenerated zeolite Y has a low hardness indicates that the hardness components contained in the raw water are efficiently removed by zeolite Y. Thus, the regeneration process may be performed more efficiently, when regeneration water having the pH of 2 to 4 is supplied to zeolite Y.

The ion exchanger is periodically exposed to regeneration water produced by electrolysis and including hydrogen ions (H$^+$). Thus, an ion exchanger having acid resistance may be used. More particularly, zeolite Y having acid resistance against electrolyzed regeneration water having a pH of 2 to 4 may be used as the ion exchanger according to the illustrated embodiment.

Based on this principle, zeolite Y having a Si/Al ratio of 1 to 5, a pore with a diameter greater than 4 nm, and acid resistance in a pH of 2 to 4 may be used as the ion exchanger according to the illustrated embodiment.

The ion exchanger may be used in at least one form of powder, bead, and fiber. The ion exchanger may also be used in a form adhered to a fibrous or porous polymer. When the ion exchanger is used in the form adhered to a fibrous or porous polymer, the polymer may be formed of a material including polypropylene (PP).

The fluid passage 140 guides soft water produced by the softening unit 130, and regeneration water, concentrated water, and alkaline water produced by the regeneration unit 120. During the regeneration process, acidic regeneration water including hydrogen ions (H$^+$) and concentrated water including the hardness components (Ca$^{2+}$ and Mg$^{2+}$) may be produced at the positive electrode 125$a$, and alkaline water including hydroxide ions (OH$^-$) may be produced at the negative electrode 125$b$. In addition, during the softening process, soft water including hydrogen ions (H$^+$) may be produced at the positive electrode 125$a$. The fluid passage 140 guides the regeneration water, concentrated water, alkaline water, soft water, and raw water so as to be appropriately supplied.

The fluid passage 140 may include a first fluid passage 140$a$, a second fluid passage 140$b$, and a third fluid passage 140$c$. The first fluid passage 140$a$ is disposed adjacent to the inlet 101 of the housing 110 and guides raw water into the ion exchanger. The second fluid passage 140$b$ is disposed adjacent to the outlet 102 of the housing 110 and guides concentrated water produced at the positive electrode 125$a$ to be discharged or guides soft water for an appropriate purpose. The third fluid passage 140$c$ is disposed adjacent to the outlet 102 of the housing 110 and guides alkaline water produced at the negative electrode 125$b$ to be discharged.

The sensor unit 145 may be disposed in the housing 110 of the softening apparatus 100 or adjacent to the outlet 102 in order to determine a time-point to initiate regeneration of the softening apparatus 100. After the softening process for a predetermined capacity is performed, the regeneration process needs to be performed to remove impurities accumulated in the ion exchanger. In this regard, the time-point to initiate regeneration may be determined by sensing the hardness components of soft water by using the sensor unit 145.

The sensor unit 145 may include at least one sensor selected from the group consisting of a hardness sensor, an electrical conductivity sensor, and a flow rate sensor. The hardness sensor senses hardness components of soft water discharged from the softening unit 130. The electrical conductivity sensor senses a change of electrical conductivity in accordance with the hardness components of soft water discharged from the softening unit 130. The flow rate sensor senses an amount of soft water treated by the softening unit 130. The sensed results are output to the controller 150.

The controller 150 receives the results sensed by the sensor unit 145, determines the time-point to initiate regeneration of the softening apparatus 100, and controls power applied to the electrode 125 to produce regeneration water having an appropriate pH level.

With regard to the determination of the time-point to initiate regeneration, the controller 150 applies power to the electrode 125 to initiate a regeneration mode when an instruction to initiate a regeneration operation is input via the input unit 105 or when the time-point to initiate the regeneration operation is determined based on a preset reference. Hereinafter, a control process to automatically perform the regeneration mode based on the preset reference will be described in addition to a case that an instruction to initiate a regeneration operation is input via the input unit 105.

First, when hardness data of soft water sensed by the hardness sensor is output, the amount of the hardness components included in the soft water may be determined by using an output signal from the hardness sensor. In this case, when the output signal from the hardness sensor reaches a preset first reference for hardness, the time-point to initiate regeneration is determined.

In addition, when electrical conductivity data of soft water sensed by the electrical conductivity sensor is output, the amount of the hardness components included in the soft water may be determined by using an output signal from the electrical conductivity sensor. In this case, when the output signal from the electrical conductivity sensor reaches a preset second reference for electrical conductivity, the time-point to initiate regeneration is determined.

Also, when flow rate data of soft water sensed by the flow rate sensor is output, the amount of soft water treated by the softening unit 130 may be counted by using an output signal from the flow rate sensor. In this case, when the output signal from the flow rate sensor reaches a preset third reference for flow rate, the time-point to initiate regeneration is determined.

When the time-point to initiate regeneration is determined, regeneration water having a pH within a predetermined range needs to be supplied for efficient regeneration. Accordingly, the softening apparatus 100 according to the illustrated embodiment may be controlled to supply regeneration water having a pH of 2 to 4.

The pH of the regeneration water may be adjusted by controlling intensity of a voltage applied to the electrodes 125, an amount of current, and current flowing time. In an experiment of electrolysis performed while applying a voltage of 10 V to Pt/Ti electrodes having a size of 7 cm*22 cm and supplying a current of 4 A for 2 hours, acidic water having a pH of 3 was produced at the positive electrode 125$a$ and zeolite Y saturated with the hardness components was regenerated by 50%.

In this regard, regeneration having a pH of 2 to 4 may be supplied by adjusting the intensity of voltage, amount of current, current flowing time, and the like in accordance with the shape, size, and material of the electrode 125. The control process by the controller 150 related to the pH adjustment should be understood to include various controls within the range of design modification which could be made by one of ordinary skill in the art.

Hereinafter, the softening process and the regeneration process of the softening apparatus 100 of FIG. 1 will be described in detail.

Figure 11:
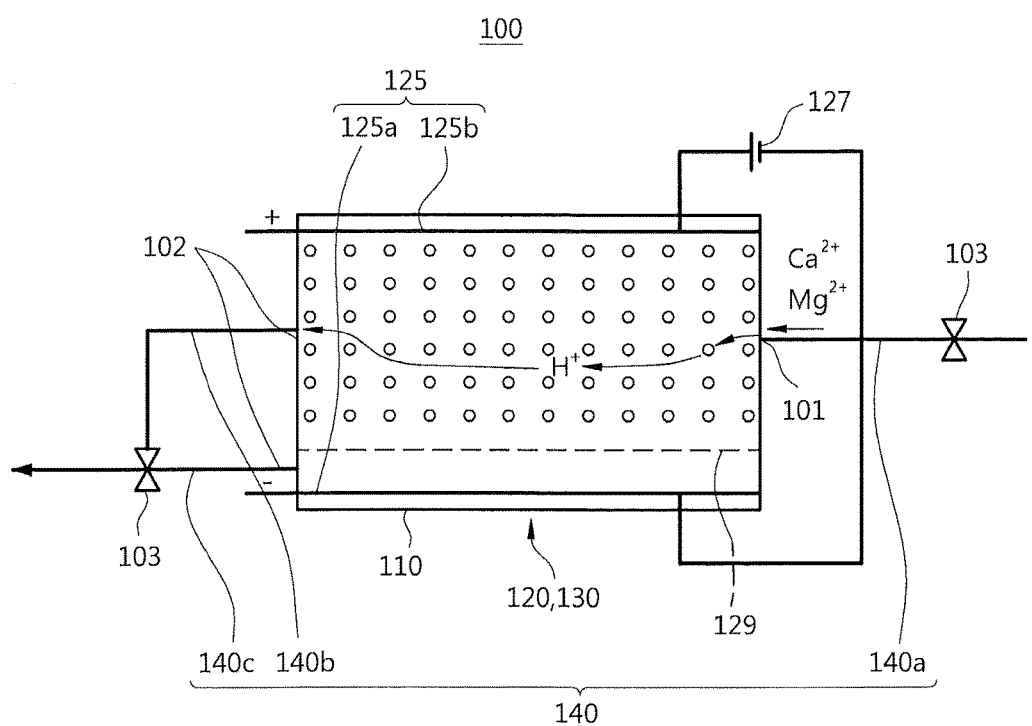
FIG. 11 is a diagram illustrating a softening process of a softening apparatus according to an embodiment of the present disclosure.
Figure 12:
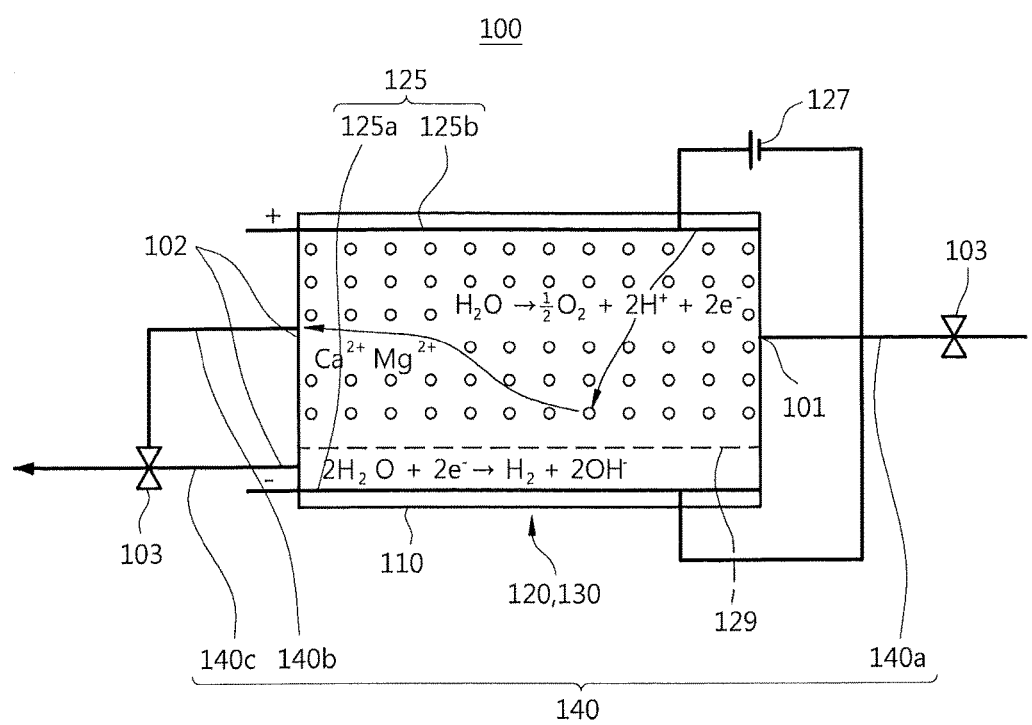
FIG. 12 is a diagram illustrating a regeneration process of the softening apparatus.
Figure 13:
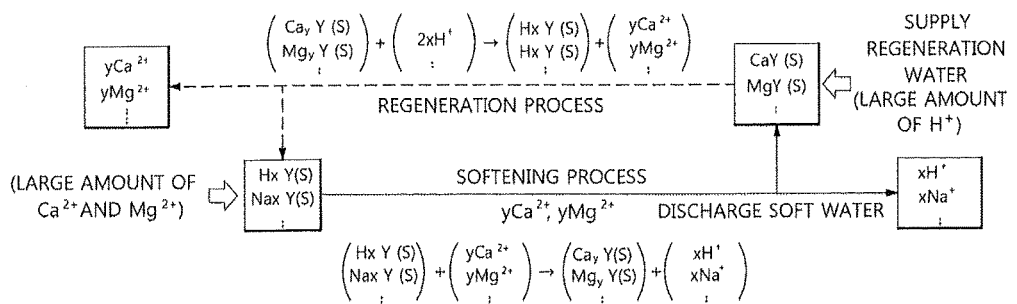
FIG. 13 is a reaction scheme illustrating the softening and regeneration processes illustrated in FIGS. 11 and 12.

FIG. 11 is a diagram illustrating a softening process of the softening apparatus 100. FIG. 12 is a diagram illustrating a regeneration process of the softening apparatus 100. FIG. 13 is a reaction scheme illustrating the softening and regeneration processes illustrated in FIGS. 11 and 12. Hereinafter, the softening process and the regeneration process by using zeolite Y as an ion exchanger will be described.

Referring to FIG. 11, when raw water is introduced into the softening unit 130 through the inlet 101, the raw water arrives at zeolite Y disposed in the softening unit 130. When the raw water arrives at zeolite Y, hardness components ($Ca^{2+}$ and $Mg^{2+}$) contained in the raw water are exchanged with cations contained in the zeolite Y, so that soft water is discharged through a first outlet 102 of the housing 110. That is, the softening process of raw water is performed while the hardness components ($Ca^{2+}$ and $Mg^{2+}$) of the raw water are adsorbed to the ion exchanger and the cations of the ion exchanger are detached therefrom, simultaneously.

Reaction Schemes 1 and 2 show a process of adsorbing the hardness components ($Ca^{2+}$ and $Mg^{2+}$) onto zeolite particles.

Reaction Scheme 1

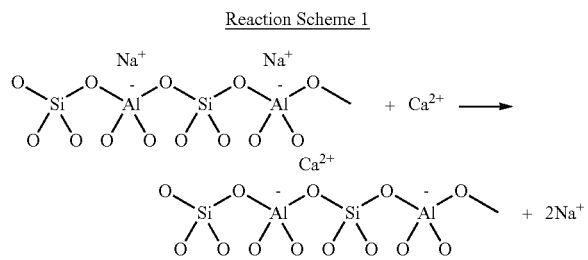

Reaction Scheme 2

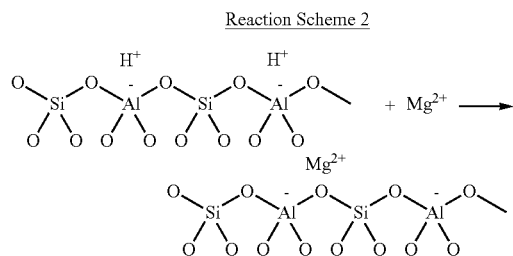

During the early stage, zeolite particles may be provided in the form of NaY(s) including sodium ions ($Na^+$) or in the form of HY(s) including hydrogen ions ($H^+$). However, the regeneration process is performed by ion-exchange between hydrogen ions ($H^+$) produced during electrolysis of water and having a high concentration and calcium ions ($Ca^{2+}$) and between the hydrogen ions ($H^+$) and magnesium ions ($Mg^{2+}$). As the regeneration process and the softening process are repeated, ion exchange between hydrogen ions ($H^+$) and each of the hardness components (calcium ions ($Ca^{2+}$) and magnesium ions ($Mg^{2+}$)) is repeated, and hydrogen ions (H+) are mainly involved in ion exchange during the regeneration process and the softening process.

That is, although zeolite particles may be provided in the form of NaY(s) or HY(s) at an early stage, zeolite is provided in the form of HY(s) during the regeneration and softening processes as the regeneration and softening processes are repeatedly performed. When zeolite is provided in the form of NaY(s), zeolite in the form of NaY(s) is involved in the softening process only at the early stage.

After the softening process is performed for a predetermined capacity, the regeneration process needs to be performed to remove impurities accumulated in the zeolite Y. That is, the softening apparatus 100 may be continuously used by removing impurities such as the hardness components ($Ca^{2+}$ and $Mg^{2+}$) accumulated in zeolite Y through regeneration thereof. Hereinafter, a regeneration operation of the softening apparatus 100 will be descried with reference to FIG. 12.

As illustrated in FIG. 12, water is electrolyzed when power is applied between the positive electrode 125a and the negative electrode 125b of the regeneration unit 120. Thus, a reaction as illustrated in Reaction Scheme 3 occurs at the positive electrode 125a, and a reaction as illustrated in Reaction Scheme 4 occurs at the negative electrode 125b.

$H_2O \rightarrow \frac{1}{2}O_2 + 2H^+ + 2e^-$  Reaction Scheme 3

$2H_2O + 2e^- \rightarrow H_2 + 2OH^-$  Reaction Scheme 4

As illustrated in Reaction Schemes 3 and 4, regeneration water having a high concentration of hydrogen ions ($H^+$) is produced at the positive electrode 125a, and alkaline water having a high concentration of hydroxide ions ($OH^-$) is produced at the negative electrode 125b.

The regeneration water is supplied to zeolite Y disposed around the positive electrode 125a. Here, zeolite Y is regenerated by ion exchange between calcium ions ($Ca^{2+}$) or magnesium ions ($Mg^{2+}$) adsorbed onto the ion exchanger and hydrogen ions ($H^+$) having a high concentration. Meanwhile, alkaline water is discharged to the outside through the third fluid passage 140c.

A softening and regeneration cycle as illustrated in FIG. 13 may be obtained by combining the principles of operations as illustrated in FIGS. 11 and 12. In FIG. 13, solid lines indicate the softening process, and dashed lines indicate the regeneration process.

Referring to FIG. 13, zeolite Y may be provided in the forms of HY(s) and NaY(s). When raw water including hardness components ($Ca^{2+}$ and $Mg^{2+}$) is supplied to zeolite Y disposed in the softening unit 130, calcium ions ($Ca^{2+}$) or magnesium ions ($Mg^{2+}$) are adsorbed onto zeolite Y, and simultaneously, hydrogen ions ($H^+$) or sodium ions ($Na^+$), which are cations of zeolite Y, are detached from zeolite Y. Thus, after the softening process is completed, soft water including hydrogen ions ($H^+$) or sodium ions ($Na^+$) is discharged through the second fluid passage 140b.

After the softening process, the regeneration process is required to be performed periodically, if desired. The regeneration process uses hydrogen ions ($H^+$) produced during electrolysis of water. More particularly, acidic water having a pH of 2 to 4 and produced at the positive electrode 125a is supplied as the regeneration water.

During electrolysis of water, a large amount of hydrogen ions ($H^+$) is produced at the positive electrode 125a. Acidic water having a pH of 2 to 4 may be supplied as regeneration water by adjusting a voltage applied to the electrodes 125 during the electrolysis of water.

When regeneration water having a pH of 2 to 4 is supplied to zeolite Y disposed around the positive electrode 125a, hydrogen ions ($H^+$) of the regeneration water are exchanged with calcium ions ($Ca^{2+}$) or magnesium ions ($Mg^{2+}$) adsorbed to zeolite Y, thereby generating zeolite Y. After the regeneration process is completed, concentrated water including calcium ions ($Ca^{2+}$) and magnesium ions ($Mg^{2+}$) is discharged to the outside through the second fluid passage 140b and alkaline water is discharged to the outside through the third fluid passage 140c.

Accordingly, zeolite Y may be repeatedly provided to the softening and regeneration processes by producing regeneration water in this manner and supplying the regeneration water to zeolite Y.

Figure 14:
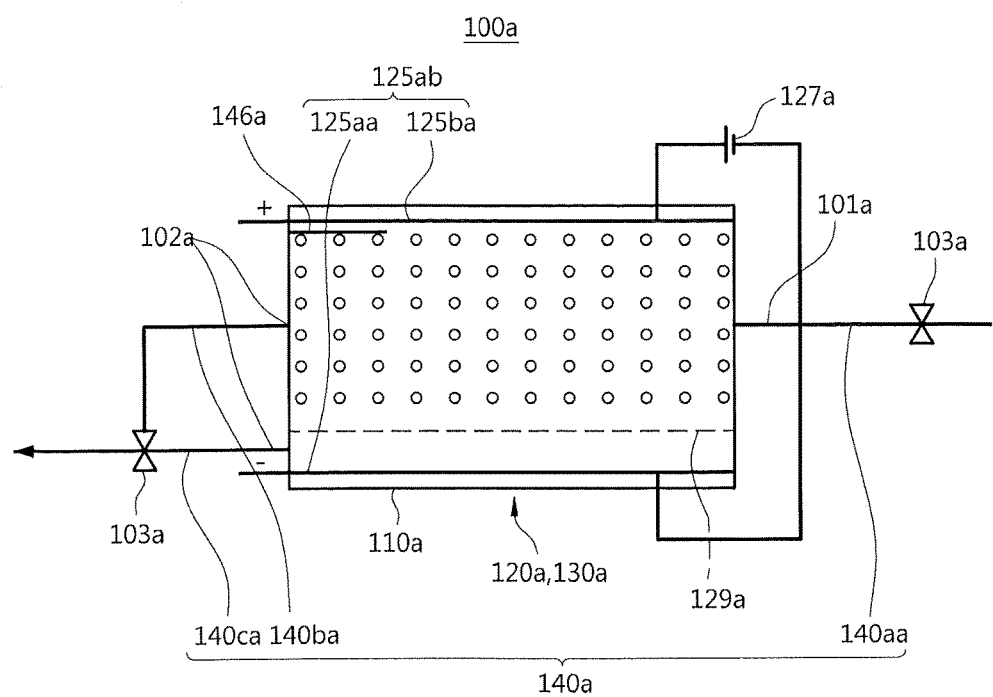
FIG. 14 is a diagram illustrating a configuration of a softening apparatus further including a pH sensor.
Figure 15:
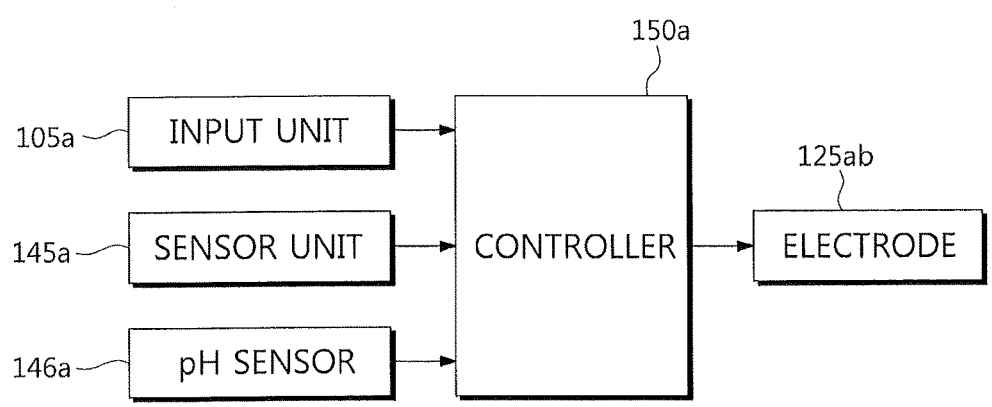
FIG. 15 is a control block diagram of the softening apparatus of FIG. 14.

Then, a softening apparatus 100a according to another embodiment of the present disclosure will be described. FIG. 14 is a diagram illustrating a configuration of the softening apparatus 100a. FIG. 15 is a control block diagram of the softening apparatus 100a of FIG. 14.

Referring to FIGS. 14 and 15, the softening apparatus 100a according to the illustrated embodiment may include an input unit 105a configured to input an instruction to operate the softening apparatus 100a, a housing 110a including an inlet 101a and an outlet 102a, valves 103a may respectively be installed at the inlet 101 and the outlet 102 to open and close the passages of raw water introduced into the inlet 101 and soft water discharged through the outlet 102, a regeneration unit 120a configured to produce regeneration water including hydrogen ions ($H^+$) through electrolysis of water, a softening unit 130a including an ion exchanger that is regenerated by received regeneration water and softens raw water including hardness components to produce soft water including hydrogen ions ($H^+$), a fluid passage 140a (140aa, 140ba, and 140ca) configured to guide raw water supplied to the softening apparatus 100a, soft water discharged from the softening unit 130a, and alkaline water, regeneration water, and concentrated water discharged from the regeneration unit 120a, a sensor unit 145a configured to acquire data for sensing a time-point to initiate regeneration, a pH sensor 146a configured to acquire pH data of regeneration water to control the pH of the regeneration water, and a controller 150a configured to determine a time-point to initiate regeneration and controls power applied to electrodes 125ab to produce regeneration water having a pH of 2 to 4. The regeneration unit 120a may include the electrodes 125ab capable of electrolyzing the raw water. The electrodes 125ab may include a single or multiple positive electrodes 125aa and a single or multiple negative electrodes 125ba each having a planar or circular shape, a power supply 127a configured to apply power to the electrodes 125ab, and a separator 129a disposed between the electrodes 125ab and allowing selective ion permeation. Since constituent elements except for the pH sensor 146a are substantially the same as those of FIG. 1, descriptions presented above will not be repeated herein.

The pH sensor 146a senses a pH of regeneration water. The controller 150a may adjust the pH of regeneration water by using pH data sensed by the pH sensor 146a. That is, according to the illustrated embodiment, the soften apparatus 100a including the pH sensor 146a directly adjusts the pH of regeneration water, and thus accuracy of controlling the pH may be improved.

Then, a method of controlling the softening apparatus 100a will be described.

The method of controlling the softening apparatus 100a includes determining a time-point to initiate regeneration of an ion exchanger, and controlling the regeneration unit 120a to produce regeneration water having a pH of 2 to 4 when the time-point to initiate regeneration of the ion exchanger is determined.

The determining of the time-point to initiate regeneration of the ion exchanger may include determining a time-point to initiate regeneration of the ion exchanger when an output from the hardness sensor reaches a preset first reference for hardness, determining a time-point to initiate regeneration of the ion exchanger when an output from the electrical conductivity sensor reaches a preset second reference for electrical conductivity, and determining a time-point to initiate regeneration of the ion exchanger when an output from the flow rate sensor reaches a preset third reference for flow rate. In this regard, descriptions presented above will not be repeated herein.

When the time-point to initiate regeneration of the ion exchanger is determined, the producing of regeneration water having a pH of 2 to 4 by the regeneration unit 120 may include controlling power applied to the electrodes 125ab to produce the regeneration water having a pH of 2 to 4. In this regard, regeneration water having a pH of 2 to 4 may be produced by adjusting intensity of power applied to the electrodes, amount of current, or current flowing time. In this regard, description presented above will not be repeated herein.

Figure 16:
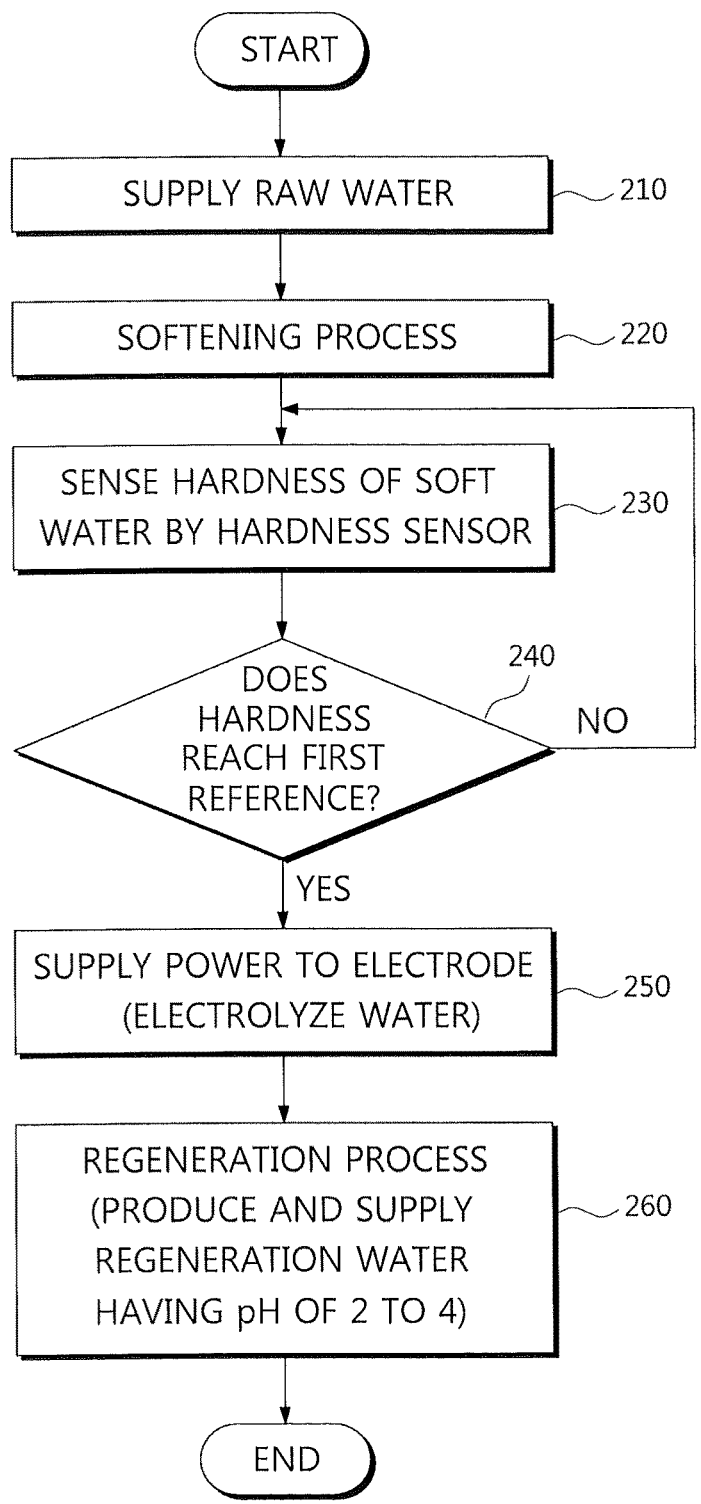
FIG. 16 is a control flowchart of a softening apparatus according to an embodiment of the present disclosure.

FIG. 16 is a control flowchart of the softening apparatus 100. A process of controlling the softening apparatus 100 will be described with reference to a method of determining a time-point to initiate regeneration of the ion exchanger by using a hardness sensor.

When raw water is fed into the softening apparatus 100 and the softening process is repeatedly performed, the ion exchanger needs to be regenerated (210 and 220). When a time-point to initiate regeneration is determined, the regeneration process is performed. When a hardness sensor senses hardness of soft water and the sensed hardness reaches a preset first reference for hardness, the time-point to initiate regeneration may be determined (230 and 240).

When the hardness of soft water does not reach the preset first reference for hardness, the hardness sensor continuously senses hardness of soft water. When it is determined that the hardness of soft water reaches the preset first reference for hardness, power is applied to the electrodes and water is electrolyzed. In this regard, regeneration water having a pH of 2 to 4 may be produced by adjusting intensity of power applied to the electrodes, an amount of current, or current flowing time (250). The produced regeneration water is supplied to the ion exchanger to regenerate the ion exchanger (260).

Then, a method of controlling the softening apparatus 100a will be described in detail. The method of controlling the softening apparatus 100a is used to control the softening apparatus 100a including the pH sensor 146a. In order to produce regeneration water having a pH of 2 to 4, the intensity of power, amount of current, or current flowing time may be adjusted in advance. However, the pH sensor 146a may directly acquire pH data of the regeneration water and control the pH of regeneration water.

Figure 17:
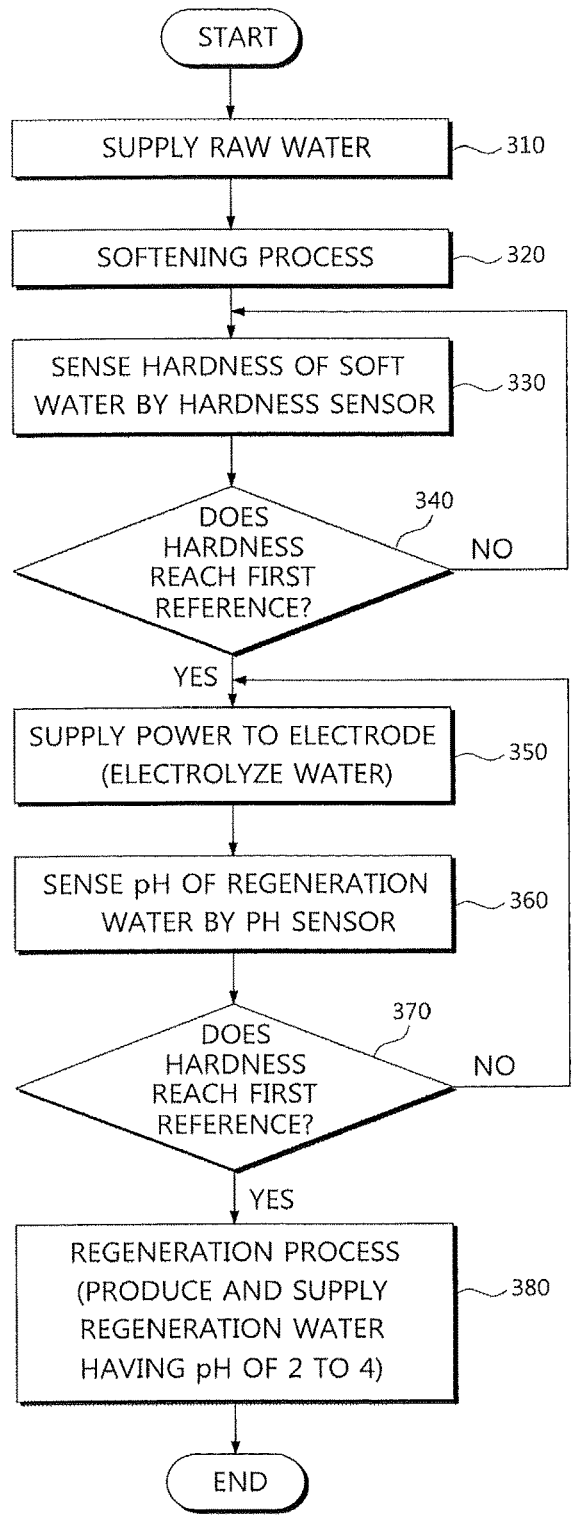
FIG. 17 is a control flowchart illustrating a control process of a softening apparatus including a pH sensor.

FIG. 17 is a control flowchart illustrating a control process of the softening apparatus 100a including the pH sensor 146a. A process of controlling the softening apparatus 100a will be described with reference to a method of determining a time-point to initiate regeneration of the ion exchanger by using a hardness sensor.

When raw water is fed into the softening apparatus 100a and the softening process is repeatedly performed, the ion exchanger needs to be regenerated (310 and 320). When a time-point to initiate regeneration is determined, the regeneration process is performed. The time-point to initiate regeneration may be determined when the hardness sensor senses hardness of soft water and the sensed hardness reaches a preset first reference for hardness (330 and 340). This process is substantially the same as that of FIG. 14.

When the hardness of soft water does not reach the preset first reference for hardness, the sensor continuously senses hardness of soft water. When the hardness of soft water reaches the preset first reference for hardness, power is supplied to the electrodes and water is electrolyzed (350).

After electrolysis of water, the pH sensor 146a senses the pH of electrolyzed regeneration water (360). When it is determined that the pH of the regeneration water is out of the range of 2 to 4 based on the sensed pH data, electrolysis of water and sensing of the pH of the regeneration water are repeatedly performed. Meanwhile, when the pH of the regeneration water is within the range of 2 to 4, regeneration water is supplied to the ion exchanger and a regeneration process is performed (370 and 380).

The softening apparatuses 100 and 1001 and the control methods thereof should be understood to include various modifications which could be made by one of ordinary skill in the art.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A softening apparatus comprising:
   a housing configured to receive raw water;
   a regenerator provided in the housing and configured to produce regeneration water comprising hydrogen ions (H$^+$) by electrolyzing the raw water;
   a softener provided in the housing and comprising an ion exchanger configured to be regenerated by the regeneration water produced in the housing by the regenerator and configured to convert the raw water comprising hardness components into soft water, the ion exchanger comprising zeolite Y having acid resistance against electrolyzed water having a pH of 2 to 4; and
   a controller configured to control the softener to convert the raw water into soft water and determine a time-point to initiate regeneration, and when the time-point to initiate regeneration is determined, to discharge the soft water from the housing, to receive raw water into the housing onto the regenerator and the softener, to control the regenerator to produce the regeneration water having a pH of 2 to 4 to regenerate the ion exchanger in the housing while the regeneration water having a pH of 2 to 4 is produced in the housing, and to discharge the regeneration water from the housing.

2. The softening apparatus according to claim 1, wherein the ion exchanger has a Si/Al ratio of 1 to 5.

3. The softening apparatus according to claim 1, wherein the ion exchanger has an inner pore.

4. The softening apparatus according to claim 3, wherein the inner pore has a diameter greater than 4 nm.

5. The softening apparatus according to claim 1, wherein the ion exchanger is used in at least one form selected from the group consisting of powder form, bead form, and fiber form.

6. The softening apparatus according to claim 1, wherein the ion exchanger is used in a form adhered to a fibrous or porous polymer.

7. The softening apparatus according to claim 6, wherein the porous polymer is formed of a material comprising polypropylene (PP).

8. The softening apparatus according to claim 1, wherein the regenerator comprises electrodes disposed in the housing.

9. The softening apparatus according to claim 8, wherein the controller controls power applied to the electrodes to allow the regenerator to produce regeneration water having the pH of 2 to 4.

10. The softening apparatus according to claim 1, wherein the controller controls the regeneration water to periodically be supplied to the ion exchanger.

11. The softening apparatus according to claim 1, further comprising a hardness sensor configured to sense hardness of soft water discharged from the softener,
    wherein the controller determines the time-point to initiate regeneration when an output of the hardness sensor reaches a preset first reference for hardness.

12. The softening apparatus according to claim 1, further comprising an electrical conductivity sensor configured to sense electrical conductivity of soft water discharged from the softener,
    wherein the controller determines the time-point to initiate regeneration when an output of the electrical conductivity sensor reaches a preset second reference for electrical conductivity.

13. The softening apparatus according to claim 1, further comprising a flow rate sensor configured to sense flow rate of soft water discharged from the softener,
    wherein the controller determines the time-point to initiate regeneration when an output of the flow rate sensor reaches a preset third reference for flow rate.

14. The softening apparatus according to claim 1, further comprising a pH sensor configured to sense the pH of the regeneration water.

15. The softening apparatus according to claim 14, wherein the controller receives data sensed by the pH sensor and controls the regenerator to produce the regeneration water having the pH of 2 to 4.

16. The softening apparatus according to claim 1, further comprising:
    a pH sensor disposed in the interior space and configured to sense the pH of the regeneration water, wherein
    based on data sensed by the pH sensor, the controller controls power applied to the electrodes to produce the regeneration water having the pH of 2 to 4.

17. A method of controlling a softening apparatus comprising a housing configured to receive raw water, a regenerator provided in the housing and configured to produce regeneration water comprising hydrogen ions (H+) by electrolyzing the raw water, and a softener provided in the housing and comprising an ion exchanger configured to be regenerated by the regeneration water produced in the housing by the regenerator and configured to convert the raw water comprising hardness components into soft water, the ion exchanger comprising zeolite Y having acid resistance against electrolyzed water having a pH of 2 to 4, the method comprising:
    controlling the softener to convert the raw water into soft water;
    determining a time-point to initiate regeneration of the ion exchanger; and
    when the time-point to initiate regeneration of the ion exchanger is determined,
       discharging the soft water from the housing;
       receiving raw water into the housing onto the regenerator and the softener;
       controlling the regenerator to produce regeneration water having a pH of 2 to 4 to regenerate the ion exchanger in the housing while the regeneration water having a pH of 2 to 4 is produced in the housing; and
       discharging the regeneration water from the housing.

18. The method according to claim 17, wherein:
    the regenerator comprises electrodes, and
    the producing of the regeneration water having the pH of 2 to 4 when the time-point to initiate regeneration of the ion exchanger is determined comprises controlling power applied to the electrodes such that the regenerator produces the regeneration water having the pH of 2 to 4.

19. The method according to claim 17, wherein:

the softening apparatus further comprises a pH sensor configured to sense the pH of the regeneration water, and the producing of regeneration water having the pH of 2 to 4 when the time-point to initiate regeneration of the ion exchanger is determined comprises producing the regeneration water having the pH of 2 to 4 by receiving data sensed by the pH sensor.

20. The method according to claim 17, wherein:

the softening apparatus further comprises a hardness sensor configured to sense hardness of soft water discharged from the softener, and the determining of the time-point to initiate regeneration comprises determining the time-point to initiate regeneration when an output from the hardness sensor reaches a preset first reference for hardness.

21. The method according to claim 17, wherein:

the softening apparatus further comprises an electrical conductivity sensor configured to sense electrical conductivity of soft water discharged from the softener, and the determining of the time-point to initiate regeneration comprises determining the time-point to initiate regeneration when an output from the electrical conductivity sensor reaches a preset second reference for electrical conductivity.

22. The method according to claim 17, wherein:

the softening apparatus further comprises a flow rate sensor configured to sense flow rate of soft water discharged from the softener, and the determining of the time-point to initiate regeneration comprises determining the time-point to initiate regeneration when an output from the flow rate sensor reaches a preset third reference for flow rate.

23. A method of controlling a softening apparatus including a housing, a positive electrode provided in the housing, a negative electrode provided in the housing, and an ion exchanger provided in the housing, the method comprising:

receiving raw water into the housing;

supplying power to the positive electrode and the negative electrode to electrolyze the raw water and thereby generate regeneration water having a pH of 2 to 4 and alkaline water;

using the regeneration water to regenerate the ion exchanger while the regeneration water is produced in the positive electrode and the negative electrode and while the ion exchanger generates concentration water, the ion exchanger comprising zeolite Y having acid resistance against electrolyzed water having a pH of 2 to 4; and discharging the concentration water and the alkaline water from the softening apparatus.

* * * * *